July 7, 1925.  1,544,585
LE ROY F. MAURER
WINDSHIELD LOCK
Filed Aug. 29, 1924
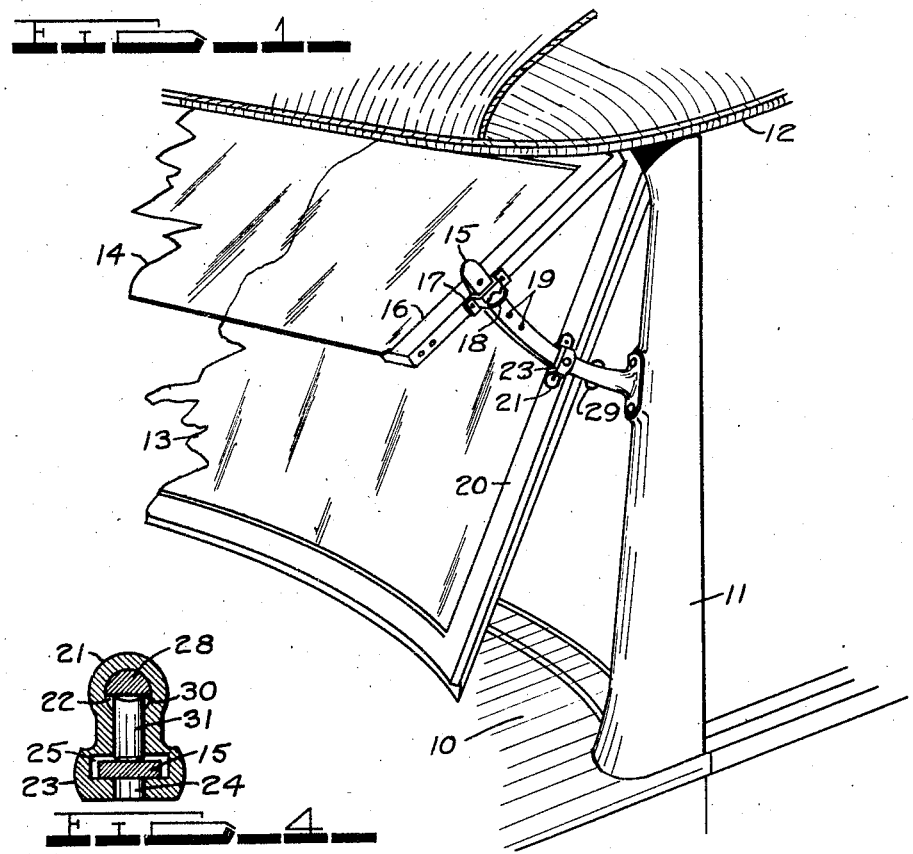
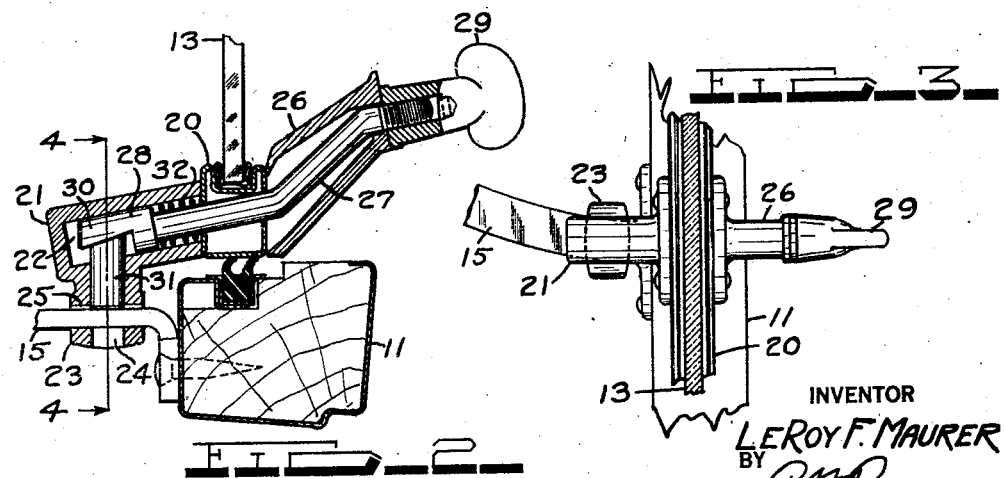
INVENTOR
LeRoy F. Maurer
BY
ATTORNEY Patented July 7, 1925.

1,544,585

UNITED STATES PATENT OFFICE.

LE ROY F. MAURER, OF SOUTH BEND, INDIANA, ASSIGNOR TO THE STUDEBAKER CORPORATION, OF SOUTH BEND, INDIANA, A CORPORATION OF NEW JERSEY.

WINDSHIELD LOCK.

Application filed August 29, 1924. Serial No. 734,927.

*To all whom it may concern:*

Be it known that I, LE ROY F. MAURER, a citizen of the United States of America, and resident of South Bend, in the county of St. Joseph and State of Indiana, have invented certain new and useful Improvements in Windshield Locks, of which the following is a specification.

This invention relates to windshields for motor vehicles and particularly to means for locking the same in a variety of adjusted positions and the object is to provide a novel, simple and effective device of this class.

Another object is to provide a small compact windshield lock that may be operated from the driving compartment of the vehicle of which it forms a part.

Another object is to provide a simple means for locking a windshield in adjusted position along a permanently secured quadrant extending forwardly from the windshield posts.

A further object is to provide a windshield lock for locking a windshield in a variety of adjusted positions along a permanently fixed quadrant, which lock comprises a nut-operated longitudinally movable member disposed in a substantially perpendicular relation to the windshield, and which is provided with a tapered or wedge end which registers with and seats against the matching end of a loosely mounted longitudinally movable plunger disposed substantially at right angles to said member and whose other end is adapted to be forced out against the quadrant when the nut-operated member is pulled back to cause the plunger to be wedged out against the same, locking the windshield in such position.

The above being among the objects of the present invention, the same consists of certain features of construction and combination of parts to be hereinafter described with reference to the accompanying drawing and then claimed, having the above and other objects in view.

In the accompanying drawing, which illustrates a suitable embodiment of the present invention, and in which like numerals refer to like parts throughout the several views, Figure 1 is a perspective view of a fragment of a motor vehicle showing the application of the present invention thereto.

Figure 2 is a fragmentary sectional view of the lock and adjacent parts of Figure 1 taken on a plane passing horizontally through the lock when the windshield is in closed position.

Figure 3 is a partially broken view of the parts shown in Figure 2 taken in a vertical direction from the center of the windshield.

Figure 4 is a detailed sectional view taken on the line 4—4 of Figure 2.

Figure 1 which illustrates that part of a motor vehicle which includes the windshield shows the cowl 10 of a motor vehicle body from which the top supports 11 project upwardly (sometimes used as and known as windshield posts) and to the upper ends of which the forward portion of the top 12 is secured for the purpose of supporting the latter. In the construction illustrated the windshield 13 and rain or sun visor 14 are hinged to the top 12, although it will be readily understood that the present invention may be equally well adapted for use in conjunction with those constructions in which the windshield is pivotally supported by the posts or supports 11 and not to the top 12. The construction and mounting of the windshield and visor form no part of my invention and a further description of the same is thought to be unnecessary.

Secured to the forward face of the supports 11 below the point of pivot of the shields 13 and 14 and projecting forwardly of the vehicle are the quadrants 15 which are formed to correspond to the arc of a circle whose center is substantially coincident with the pivotal centers of the shields 13 and 14. Secured to the frame 16 of the rain or sun shield 14 and straddling the quadrant 15 is a bracket 17 which is provided with a thumb screw 18 adapted to pass through one of the openings 19 in the quadrant 15 and thereby locks the shield 14 in one of its adjusted positions. Secured to the forward face of the windshield frame 20 is a housing member 21 projecting forwardly therefrom and slightly towards the side of the vehicle, and is provided with an axial opening 22 and an offset portion 23. The offset portion 23 is provided with an axial opening 24 which lies perpendicularly to the face of the quadrant 15 and whose axis intersects the axis of the opening 22 and is provided near its outer end with a slot 25 in which the quadrant 15 is slidably received. A second housing 26 is secured to the rear face of the windshield frame 20 in a position to match the housing 21 and receives therein the member 27 which passes through the windshield frame 20 and is provided with an enlarged end 28 slidably received in the opening 22 of the member 21. The member 27 is bent to accommodate the housings 21 and 26 which are set on a slight angle from the perpendicular to the plane of the windshield 13 in order that the lock will be more accessible for operation. The rearward end of the member 27 which projects rearwardly of the housing 26 is threaded to receive the thumb nut 29 which is adapted to adjust the locking members. The enlarged forward end 28 of the member 27 is cut out on one side to provide a flat face 30 which lies at a small angle to the axis of the member 27 and which acts as a wedge or cam for a purpose to be hereinafter described. A plunger 31 slidably mounted in the opening 24 between the end 28 of the member 27 and the quadrant 15 has its end which is adjacent the member 27 preferably machined at an angle to suitably seat against the flat wedge surface 30 of the enlarged end 28 previously described. A coil spring 32 surrounding the member 27 between the enlarged end 28 and the windshield frame 20 constantly tends to move the member 27 forward, but such movement is regulated by the nut 29. When the nut 29 is loosened the spring 32 forces the member 27 and end 28 forward which causes the flat surface 30 on the end 28 to slightly recede from the plunger 31 which thereupon releases its pressure on the quadrant 15 and allows the windshield 13 to be swung to any desired position along the quadrant 15. When it is desired to lock the windshield 13 in adjusted position along the quadrant 15, the nut 29 is turned to pull the member 27 rearwardly against the pressure of the spring 32, and the flat wedge face 30 of the enlarged end 28 of the member 27 forces the plunger 31 outwardly against the quadrant 15, which forces the latter against the outside edge of the slot 25 and clamps it in that position to lock the two parts together and prevent movement of the windshield 13 in relation to the quadrant 15.

It is evident that formal changes may be made in the specific embodiment of the invention described without departing from the spirit and substance of the broad invention, the scope of which is commensurate with the appended claims.

What I claim is:—

1. In a vehicle, a pivoted member and a stationary member, a bracket secured to said pivoted member provided with means for slidably receiving said stationary member, a plunger confined in said bracket to engage said stationary member, a longitudinally operable member having a cam portion engaging said plunger, and means for operating said longitudinally operable member to force said plunger into locking engagement with said stationary member.

2. In a motor vehicle, a pivoted shield and a stationary quadrant, a bracket secured to said shield having a portion for slidably receiving said quadrant, a longitudinally movable member having a cam end operable in said bracket, and a plunger actuated by said cam end upon movement of said member to lock said bracket to said quadrant.

3. In a motor vehicle, a pivoted shield and a stationary quadrant, a bracket secured to said shield provided with means for slidably receiving said quadrant, a plunger lying forward of said windshield operable to lock said bracket to said quadrant, a cam member for operating said plunger, and means rearward of said shield for operating said cam member.

4. In a motor vehicle, a pivoted shield and a stationary quadrant, a bracket secured to and extending forwardly from said shield having an offset portion provided with means for slidably receiving said quadrant, a slidable plunger confined in said offset portion, a member slidably mounted in said bracket projecting rearwardly therefrom, said member being provided with a wedge surface adjacent its forward end for engagement with said plunger, and means rearwardly of said shield for operating said member.

5. In a vehicle, a pivoted shield provided with a frame and a stationary quadrant adjacent the end of said shield, a hollow bracket secured to said frame and projecting forwardly therefrom, an offset portion on said bracket provided with an opening for receiving a plunger and a slot for slidably receiving said quadrant, a member longitudinally movable in said bracket projecting rearwardly through said frame, a wedge surface on said member engaging said plunger, resilient means tending to move said wedge surface out of contact with said plunger, and screw means for causing engagement of said wedge surface and said plunger.

Signed by me at South Bend, Indiana, this 25th day of August, 1924.

LE ROY F. MAURER.

Witnesses:
JULIUS M. GAUSS,
E. W. STRICKLAND.